US008520046B2

(12) United States Patent
Sakaue et al.

(10) Patent No.: US 8,520,046 B2
(45) Date of Patent: Aug. 27, 2013

(54) IMAGE FORMING APPARATUS HAVING PLURAL OPTICAL SCANNING DEVICES

(75) Inventors: Yoshinobu Sakaue, Kanagawa (JP); Noboru Kusunose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 93 days.

(21) Appl. No.: 13/106,274

(22) Filed: May 12, 2011

(65) Prior Publication Data
US 2011/0316957 A1 Dec. 29, 2011

(30) Foreign Application Priority Data

Jun. 28, 2010 (JP) ................................. 2010-146090

(51) Int. Cl.
*B41J 2/41* (2006.01)
*B41J 2/435* (2006.01)
(52) U.S. Cl.
USPC ............................ 347/245; 347/152; 347/263
(58) Field of Classification Search
None
See application file for complete search history.

(56) References Cited

U.S. PATENT DOCUMENTS

| 7,215,349 B2 | 5/2007 | Sakaue et al. |
| 7,230,638 B2 | 6/2007 | Fukutomi |
| 7,450,146 B2 | 11/2008 | Sakaue et al. |
| 7,619,643 B2 | 11/2009 | Sakaue et al. |
| 7,697,184 B2 | 4/2010 | Sakaue et al. |
| 7,746,371 B2 | 6/2010 | Sakaue et al. |
| 7,916,161 B2 | 3/2011 | Kusunose et al. |
| 2005/0095017 A1* | 5/2005 | Kikuchi .......................... 399/12 |
| 2006/0082795 A1* | 4/2006 | Seo et al. ...................... 358/1.5 |
| 2008/0225304 A1 | 9/2008 | Sakaue et al. |

FOREIGN PATENT DOCUMENTS

| CN | 1224664 A | 8/1999 |
| CN | 1226689 A | 8/1999 |
| CN | 101598853 A | 12/2009 |
| CN | 101614997 A | 12/2009 |
| JP | 2003-84534 | 3/2003 |
| JP | 2006-58860 | 3/2006 |

OTHER PUBLICATIONS

Office Action issued Apr. 23, 2013 in Chinese Patnet Application No. 201110186542.9 (6 pages).

\* cited by examiner

*Primary Examiner* — Matthew Luu
*Assistant Examiner* — Kendrick Liu
(74) *Attorney, Agent, or Firm* — Oblon, Spivak, McClelland, Maier & Neustadt, L.L.P.

(57) ABSTRACT

The image forming apparatus includes a chassis; plural image bearing members; plural optical scanning devices having the same configuration and located on respective installation positions of the chassis after installed thereon to scan the image bearing members with light beams; and plural incompatibility imparting mechanisms. The incompatibility imparting mechanisms are located on the corresponding optical scanning devices, and have the same configuration and the same initial state before the plural optical scanning devices are installed on the chassis, but achieve incompatible states after the optical scanning devices are installed. When the optical scanning devices in the incompatible states are detached from the chassis and then attached again thereto, the incompatibility imparting mechanisms prevent the corresponding optical scanning devices from being set to positions other than the respective installation positions.

14 Claims, 12 Drawing Sheets

(a)

(b)

(c)

(a)

(b)

(a)

(b)

(a)

(b)

(a)

(b)

IMAGE FORMING APPARATUS HAVING PLURAL OPTICAL SCANNING DEVICES

BACKGROUND OF THE INVENTION

1. Field of the Invention

The present invention relates to an image forming apparatus having plural optical scanning devices.

2. Description of the Related Art

Conventionally, electrophotographic tandem color image forming apparatuses in which different color toner images are formed on plural image bearing members arranged side by side and the color toner images are overlaid on a recording material to form a color image (such as full color images) are known. In such electrophotographic tandem color image forming apparatuses, optical scanning devices irradiate the surfaces of plural photoreceptors serving as the image bearing members with light beams according to image data, thereby forming electrostatic latent images on the photoreceptors. The electrostatic latent images on the photoreceptors are then developed by respective developing devices using different color toners to form color toner images on the photoreceptors, followed by transferring the toner images onto a recording material optionally via an intermediate transfer medium such as a belt and a drum. The toner images thus overlaid on the recording material are then fixed thereon by a fixing device, resulting in formation of a copy.

In a tandem image forming apparatus using an intermediate transfer medium, a primary transfer process in which different color toner images formed on plural photoreceptors are sequentially transferred onto the intermediate transfer medium so as to be overlaid, and a secondary transfer process in which the overlaid toner images are transferred onto a recording material at the same time are performed.

In a tandem image forming apparatus using a feeding member (such as a belt), a transfer process in which different color toner images formed on plural photoreceptors are sequentially transferred onto a recording material fed by the feeding member so as to face the photoreceptors, resulting in formation of overlaid color toner images on the recording material is performed.

After the transfer process, the color toner images overlaid on the recording material are fixed thereto upon application of heat and pressure, and the recording material bearing the fixed color image is discharged from the main body of the image forming apparatus.

Recently, such color image forming apparatuses are required to have small size, low costs and long life. In order to prolong the life of a photoreceptor, a method in which when a monochrome image is formed on a photoreceptor, other photoreceptors are separated from an intermediate transfer medium is used. In addition, a method in which the diameter of photoreceptors is increased, or a method in which the diameter of a most used photoreceptor for forming black color images is increased is used.

Among such image forming apparatuses, there is an image forming apparatus in which the optical scanning positions of plural photoreceptors at which light spots are formed on the photoreceptors are not present on a line (as illustrated in FIG. 3) in order to prolong the life of the photoreceptors. When an optical scanning device having only one polygon scanner is used for scanning plural photoreceptors in such an image forming apparatus, the light paths are very complicated. Therefore, the case holding the optical elements of the optical scanning device has to have a complicated shape, and adjustment of the optical elements is also complicated. In addition, in order to separate the light paths, it is necessary to use a thick polygon scanner or a two-tier polygon mirror, and a scanning lens having a complex shape.

In attempting to solve the problem, it is considered to use plural (four) optical scanning devices for scanning the respective (four) photoreceptors, or two optical scanning devices each scanning two photoreceptors. Namely, in such image forming apparatuses, two or four optical scanning devices are used for scanning four photoreceptors with respective four light beams. Such image forming apparatuses have a relatively simple configuration compared to image forming apparatuses having only one scanning device for scanning four photoreceptors, and can easily scan photoreceptors even when the lengths of light paths to the photoreceptors are different. Therefore, such image forming apparatuses have small size and low costs.

Recently, in order to control image quality, a technique in that adjustment of the light beam position is performed by changing the position or angle of optical elements of an optical scanning device is often used. Therefore, even when plural same optical scanning devices are used for an image forming apparatus, it is often necessary to make specific adjustment for each of the optical scanning devices depending on the position of the optical scanning device. In addition, in a case where the scanning (irradiation) positions of plural photoreceptors are not on a line and thereby the distances between optical scanning devices and the photoreceptors are different, it is necessary to perform major adjustments on the optical scanning devices (particularly optical elements of the optical scanning devices) depending on the positions thereof, so that desired beam spots are formed on the photoreceptors. When such an image forming apparatus is assembled, a method in which after plural same optical scanning devices, which have been assembled in the same way and then subjected to the same preliminary adjustment, are set in the image forming apparatus, specific adjustment is performed on each of the optical scanning devices can be used. The method is simple and the resultant image forming apparatus has acceptable optical scanning property. Therefore, the method is useful.

However, in a case where the optical scanning devices are detached from the image forming apparatus for any reason, it is preferable to set again the optical scanning devices to the original positions because it is not necessary to perform a readjustment operation on the thus reset optical scanning devices.

In particular, when such a readjustment operation (particularly, a mechanical adjustment operation) is performed on the optical scanning devices at a time other than the manufacturing process within a limited period of time using limited tools, the readjustment operation has to be carefully performed. For example, in a case where a dust protective cover for an optical scanning device is detached to access an optical element located in an inner portion of the optical scanning device, it is necessary to prevent dust from entering the optical scanning device and to carefully replace the dust protective cover.

Conventional image forming apparatuses using plural optical scanning devices often cause the following problems. Specifically, when the optical scanning devices are detached from the image forming apparatus, followed by attachment to the image forming apparatus, the optical scanning devices are not attached to the original positions, and therefore it becomes necessary to detach and reset the optical scanning devices, resulting in increase in maintenance costs. In addition, dust enters into the optical scanning devices due to the readjustment, resulting in deterioration of the properties of the optical scanning devices.

For these reasons, the present inventors recognized that there is a need for an image forming apparatus which uses plural same optical scanning devices and which does not cause the above-mentioned problems when the optical scanning devices are detached from the image forming apparatus and then attached again thereto.

SUMMARY

This patent specification describes a novel image forming apparatus, one embodiment of which includes a chassis; plural image bearing members; plural optical scanning devices having the same configuration and located on respective installation positions of the chassis after installed thereon to scan the image bearing members with light beams; and plural incompatibility imparting mechanisms.

The incompatibility imparting mechanisms are located on the corresponding optical scanning devices and have the same configuration and the same initial state before the optical scanning devices are installed on the chassis, but achieve incompatible states after the optical scanning devices are installed on the chassis. When the optical scanning devices with the incompatibility imparting mechanism in the incompatible states are detached from the chassis and then attached again thereto, the incompatibility imparting mechanisms prevent the corresponding optical scanning devices from being set to positions other than the respective installation positions.

BRIEF DESCRIPTION OF THE DRAWINGS

A more complete appreciation of aspects of the invention and many of the attendant advantage thereof will be readily obtained as the same become better understood by reference to the following detailed description when considered in connection with the accompanying drawings, wherein.

DESCRIPTION OF THE PREFERRED EMBODIMENTS

The present invention will be described by reference to drawings.

Figure 1:
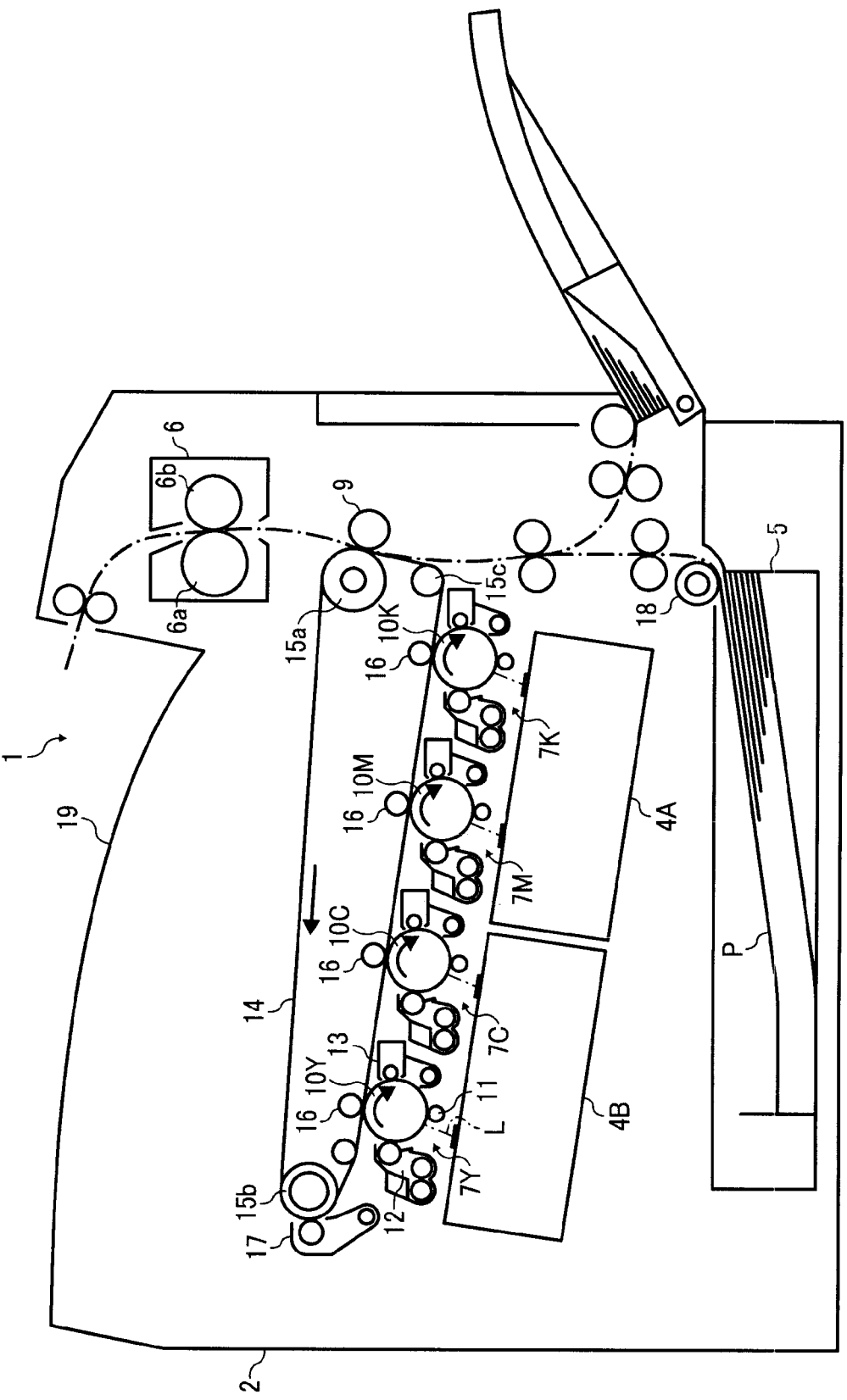
FIG. 1 is a cross-sectional view illustrating a color image forming apparatus as an example of the image forming apparatus of the present invention.

FIG. 1 is a cross-sectional view illustrating a color image forming apparatus as an example of the image forming apparatus of the present invention. Referring to FIG. 1, an image forming apparatus 1 is a tandem color printer capable of producing full color images, and includes four image forming units 7Y, 7C, 7M and 7K located at substantially the center of a main body 2 of the image forming apparatus 1. The four image forming units 7 include respective photoreceptors 10Y, 10C, 10M and 10K, which serve as image bearing members, and produce yellow, cyan, magenta and black color images.

The image forming apparatus 1 has an intermediate transfer belt 14, which is rotated in a direction indicated by an arrow and supported by three support rollers 15a, 15b and 15c. A belt cleaning unit 17 to clean the surface of the intermediate transfer belt 14 is provided on the left side of the support roller 15b. The image forming units 7Y, 7C, 7M and 7K are arranged along the stretched lower portion of the intermediate transfer belt 14 in this order relative to the moving direction thereof while forming a space therebetween.

On the surfaces of the photoreceptors 10Y, 10C, 10M and 10K of the image forming units 7, yellow, cyan, magenta and black color toner images are formed respectively as mentioned below. The color toner images are sequentially transferred onto the intermediate transfer belt 14 by primary transfer rollers 16, which are provided so as to contact the back side of the lower portion of the intermediate transfer belt 14, thereby forming a combined color toner image, in which the color toner images are overlaid, on the intermediate transfer belt. The positions of the intermediate transfer belt 14, at which the primary transfer rollers 16 are contacted with the backsides thereof, are transfer positions, and color toner images are transferred at the transfer positions.

The combined color toner image formed on the intermediate transfer belt 14 is transferred onto a recording material at a secondary transfer position (nip) at which the intermediate transfer belt is contacted with a secondary transfer roller 9 while pressed by the support roller 15a. The recording material bearing the combined color toner image thereon is fed to a fixing device 6, and the toner image is fixed by a pair of fixing rollers 6a and 6b upon application of heat and pressure thereto. The recording material bearing the fixed color toner image is then discharged by a pair of discharge rollers on a copy tray 19. Thus, a full color image can be prepared.

In this example, in order to perform a black and white image forming operation, the photoreceptor 10K is always contacted with the intermediate transfer belt 14. The other photoreceptors 10Y, 10C and 10M are detachably attached to the intermediate transfer belt 14 by a movable tension roller.

The image forming units 7Y, 7C, 7m and 7K have the same mechanical structure and perform the same image forming operation except that the color of the toner used for development is different. Hereinafter, the structure and image forming operation of any one (for example, image forming unit 7Y) of the image forming units will be described while the suffixes (Y, C, M and K) are sometimes omitted from the reference numbers of parts except for the photoreceptors 10.

Around the photoreceptor 10Y of the image forming unit 7Y, a charging roller 11 to charge the photoreceptor, an irradiation (scanning) position at which a light beam L irradiates the photoreceptor to form an electrostatic latent image on the photoreceptor, a developing device 12 to develop the electrostatic latent image with a developer including a color (yellow) toner, and a cleaner 13 to clean the surface of the photoreceptor are arranged clockwise (i.e., in the rotation direction of the photoreceptor). The light beams L are emitted by optical scanning devices 4 (4A and 4B), each of which includes elements such as a laser diode serving as a light source, a coupling lens, an f-θ lens, a toroidal lens, a mirror, and a deflector. Each optical scanning device 4 emits light beams L to irradiate the respective photoreceptors 10, which have been charged by the respective charging rollers 11, resulting in formation of electrostatic latent images on the photoreceptors. The details of the image forming operation will be described later.

The developing device 12Y of the image forming unit 7Y develops an electrostatic latent image on the photoreceptor 10Y using a yellow developer including a yellow toner, resulting in formation of a yellow toner image on the photoreceptor 10Y. Similarly, the developing devices (12C, 12M and 12K) of the other image forming units 7 develop electrostatic latent images using cyan, magenta and black color developers, resulting in formation of cyan, magenta and black toner images on the respective photoreceptors (10C, 10M and 10K).

The image forming operation will be described in detail. Specifically, the photoreceptor 10Y, which is rotated in a direction indicated by an arrow, is charged by the charging roller 11, and is irradiated with the light beam L at the irradiation (scanning) position, resulting in formation of an electrostatic latent image on the photoreceptor. The electrostatic latent image is developed with the yellow toner when the electrostatic latent image on the photoreceptor 10Y passes the developing device 12, resulting in formation of a yellow toner image on the photoreceptor. The yellow toner image on the photoreceptor 10Y is then transferred onto the intermediate transfer belt 14 by the primary transfer roller 16. Similarly, cyan, magenta and black toner images formed on the respective photoreceptors 10C, 10M and 10K by the respective image forming units 7 are transferred onto the intermediate transfer belt 14 so as to be overlaid, resulting in formation of a combined color toner image on the intermediate transfer belt.

The combined color toner image on the intermediate transfer belt 14 is then transferred onto a recording material P, which is timely fed by a feed roller 18 from a cassette 5 toward the secondary transfer nip formed by the support roller 15a and the secondary transfer roller 9, at the secondary transfer nip.

After the toner image on the photoreceptor 10 is transferred to the intermediate transfer belt 14, the cleaner 13 cleans the surface of the photoreceptor to remove residual toner particles therefrom, followed by a discharging operation in which a discharging lamp irradiates the surface of the photoreceptor to reduce the amount of charges remaining thereon, so that the photoreceptor is ready for the next image forming operation. Similarly, the surface of the intermediate transfer belt 14 is cleaned by the belt cleaning unit 17 to remove residual toner particles therefrom.

This example of the image forming apparatus is an indirect transfer type image forming apparatus, in which toner images on the photoreceptors 10 are transferred once onto an intermediate transfer belt 14 so as to be overlaid, and the resultant combined color toner image is transferred onto a sheet of the recording material. However, the image forming apparatus of the present invention is not limited thereto, and a direct transfer type image forming apparatus, in which color toner images formed on the photoreceptors 10 are sequentially transferred onto a sheet of the recording material, which is fed by a feeding belt, resulting in formation of a combined color toner image on the recording material sheet, or the like image forming apparatus can also be included in the present invention.

Figure 2:
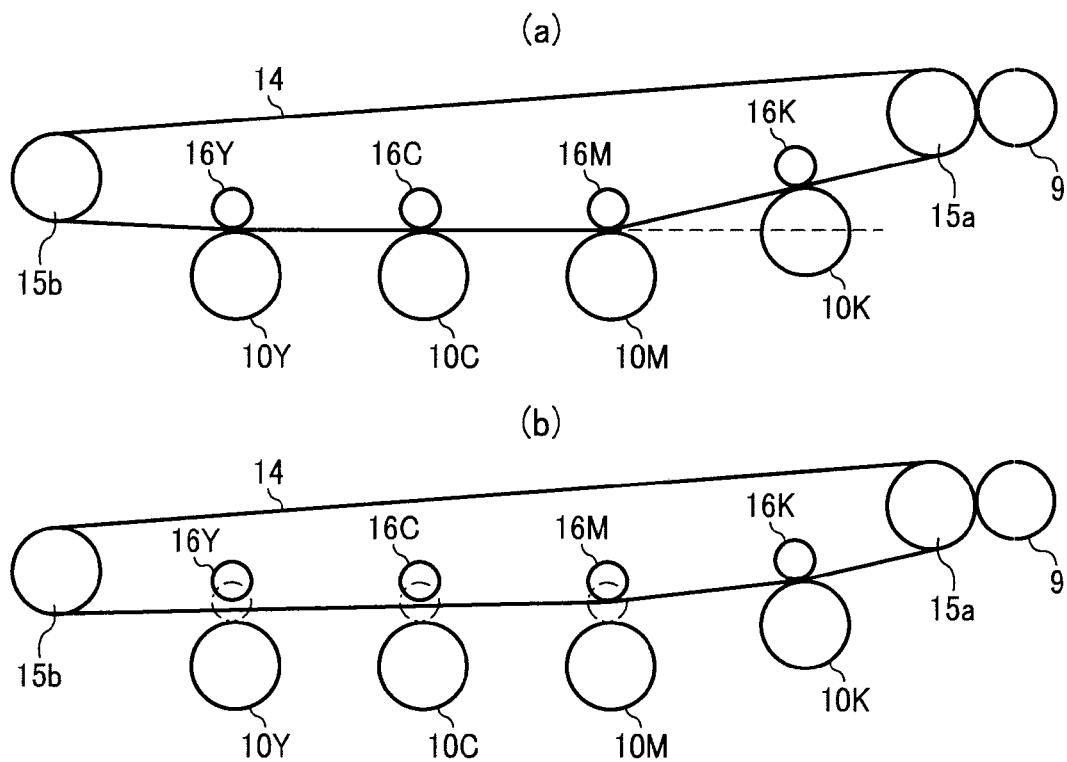
FIGS. 2(a) and 2(b) are schematic views illustrating the operation of an intermediate transfer belt of the image forming apparatus.

FIGS. 2(a) and 2(b) are schematic views for explaining the operation of the intermediate transfer belt 14. In FIG. 2 (and FIG. 3), the intermediate transfer belt 14 is supported by the two support rollers 15a and 15b unlike the intermediate transfer belt illustrated in FIG. 1.

The intermediate transfer belt 14 can selectively achieve a state in which the intermediate transfer belt contacts all the photoreceptors 10Y, 10C, 10M and 10K as illustrated in FIG. 2(a) or a state in which the intermediate transfer belt contacts only the photoreceptor 10K and is separated from the other photoreceptors 10Y, 10C and 10K as illustrated in FIG. 2(b). Specifically, among the four primary transfer rollers 16, only the primary transfer roller 16K is fixed, and the other primary transfer rollers (16Y, 16C and 16M) opposed to the photoreceptors 10Y, 10C and 10M are movably provided as illustrated by solid lines and chain double-dashed lines in FIG. 2(b). The primary transfer rollers (16Y, 16C and 16M) are moved using a motor, a clutch or a solenoid.

When a black and white image is formed, the photoreceptors 10Y, 10C and 10m are separated from the intermediate transfer belt 14 to prevent the lives of the photoreceptors from being shortened due to meaningless contact of the photoreceptors with the intermediate transfer belt.

In this example of the image forming apparatus, the photoreceptors 10Y, 10C and 10M are linearly arranged as illustrated in FIG. 2(a), and only the black image forming photoreceptor 10K is shifted from the line of the photoreceptors 10Y, 10C and 10M. Therefore, the contact position of the photoreceptor 10K with the intermediate transfer belt 14 is also shifted from the line of the other contact positions illustrated by a broken line in FIG. 2(a). Accordingly, the photoreceptors 10Y, 10C and 10M can be attached to or detached from the intermediate transfer belt 14 using a simple attaching/detaching mechanism.

Figure 3:
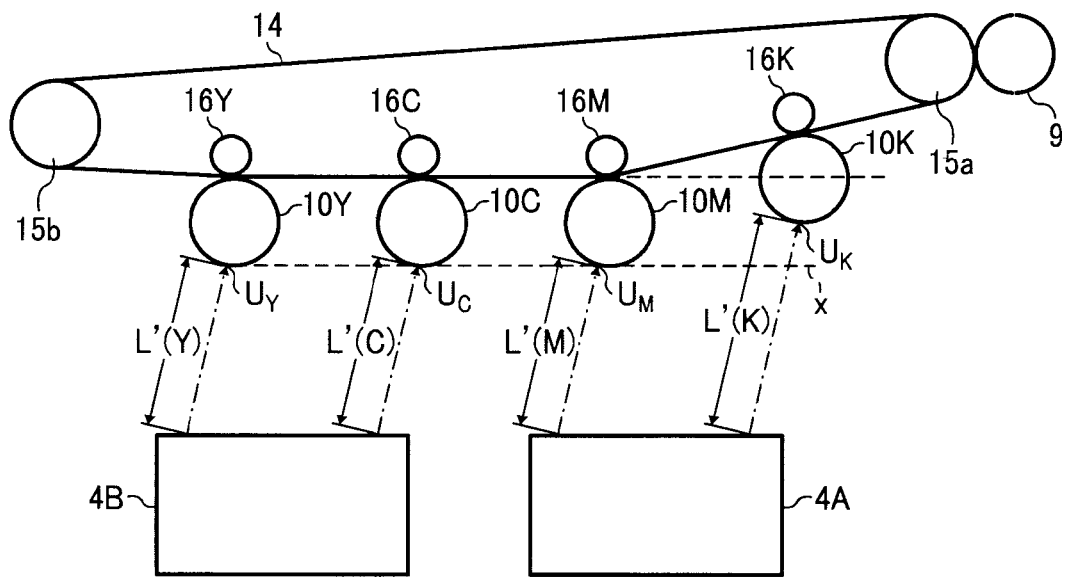
FIG. 3 is a schematic view illustrating the scanning (irradiation) positions of photoreceptors of the image forming apparatus.

When the photoreceptors 10 have the same diameter to reduce costs of the image forming apparatus, an irradiation (scanning) position $U_K$ of the photoreceptor 10K at which the light beam irradiates the photoreceptor is shifted from the line of the other irradiation positions $U_Y$, $U_C$ and $U_M$ illustrated by a broken line x in FIG. 3.

The optical scanning device 4 consists of an optical scanning device 4A to irradiate the black image forming photoreceptor 10K and the magenta image forming photoreceptor 10M, and an optical scanning device 4B to irradiate the cyan image forming photoreceptor 10C and the yellow image forming photoreceptor 10Y. The optical scanning devices 4A and 4B have the same configuration and are therefore exchangeable with each other.

As illustrated in FIG. 3, since the black image forming photoreceptor 10K is shifted from the line of the photoreceptors 10Y, 10C and 10M, length of a light path L'(K) between the optical scanning device 4A and the irradiation position $U_K$ is longer than lengths of the light paths L'(Y), L'(C) and L'(M) between the corresponding optical scanning devices 4 and the irradiation positions $U_Y$, $U_C$ and $U_M$, which are the same. Namely, the following relation is satisfied.

$$L'(K) > L'(Y) = L'(C) = L'(M)$$

Next, the optical scanning device 4 will be described.

As mentioned above, since the optical scanning devices 4A and 4B are the same, description of the optical scanning devices will be made while sometimes omitting the suffixes A and B if it is unnecessary to distinguish between the optical scanning devices 4A and 4B.

Figure 4:
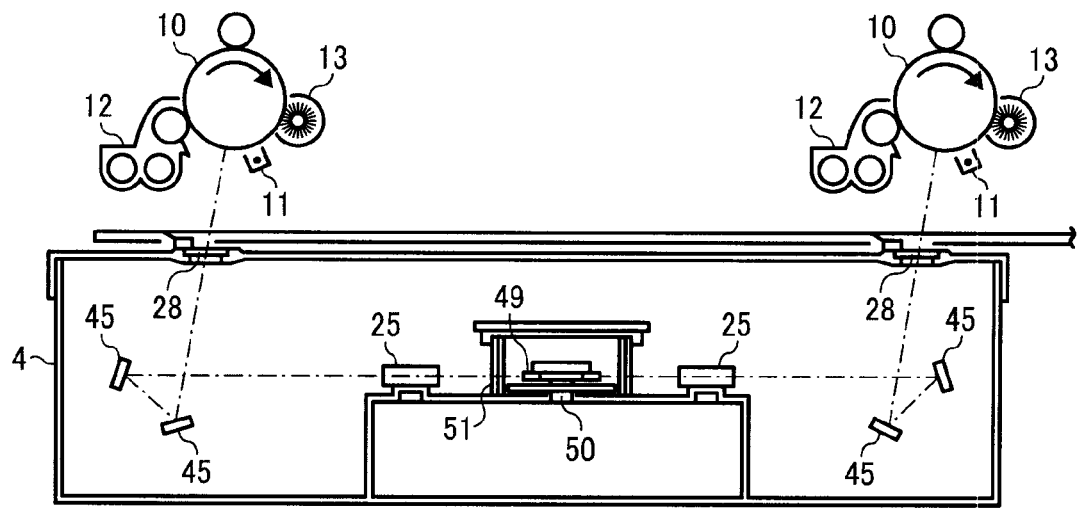
FIG. 4 is a schematic view illustrating an optical scanning device and image forming units of the image forming apparatus.
Figure 5:
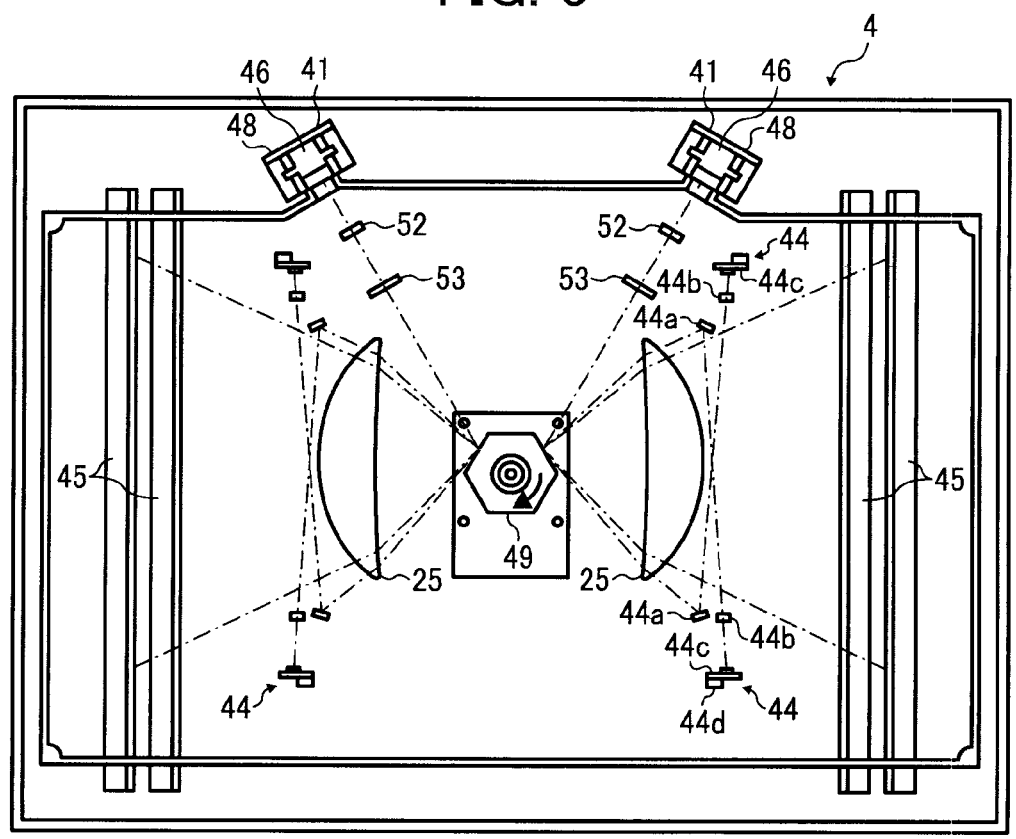
FIG. 5 is a plan view illustrating an optical scanning device of the image forming apparatus.

FIG. 4 is a schematic view illustrating the optical scanning device 4 and the image forming units 7, and FIG. 5 is a plan view illustrating the optical scanning device.

As illustrated in FIG. 4, the optical scanning device 4 is a tandem optical scanning device, and is a scanning lens type optical scanning device. However, the optical scanning device is not limited thereto, and for example a scanning mirror type optical scanning device can also be used therefor.

The optical scanning device 4 includes a deflector 50 serving as a main scanning deflecting member, and optical elements such as various kinds of mirrors and lenses. The deflector 50 is arranged at substantially the center of the optical scanning device 4 while surrounded by a soundproof glass 51, and has a mirror portion 49 fixed on a rotation shaft of a polygon motor. In the optical scanning device 4A, an optics system for irradiating the black image forming photoreceptor 10K is arranged on the right side of the deflector 50, and an optics system for irradiating the magenta image forming photoreceptor 10M is arranged on the left side of the deflector 50. In the optical scanning device 4B, an optics system for irradiating the cyan image forming photoreceptor 10C is arranged on the right side of the deflector 50, and an optics system for irradiating the yellow image forming photoreceptor 10Y is arranged on the left side of the deflector 50.

As illustrated in FIG. 5, the optical scanning device 4 is a counter scanning type optical scanning device, and has light source units 41 and 41 serving as light beam emitting members.

The optical scanning device 4A emits light beams L for irradiating the photoreceptors 10K and 10M, and the optical scanning device 4B emits light beams L for irradiating the photoreceptors 10C and 10Y. In general, a general purpose laser diode (LD) is used for the light source unit 41. In the light source unit 41, a light source 48, and a laser emitting element driving circuit board are supported y a light source supporter 46. A collimator lens 52 and a cylindrical lens 53 are arranged on each of the light paths of light beams between the light source units 41 and 41 and the mirror portion 49 of the deflector 50, and an f-θ lens 25 and a reflection mirror 45 are arranged on each of the light paths of light beams between the mirror portion 49 and the photoreceptors 10. In addition, a reflection mirror may be arranged on the light path between the light source unit 41 and the mirror portion 49 of the deflector 50, and a long lens may be arranged on the light path between mirror portion 49 and the photoreceptor 10.

When a light beam emitted by the light source unit 41 passes through an aperture (not shown), the light beam L has a predetermined shape. The light beam L then enters the cylindrical lens 53 to correct the face tangle error thereof. The light beam L passing through the cylindrical lens 53 is deflected by a side surface of the mirror portion 49 after passing the soundproof glass 51, resulting in scanning of the light beam L in the main scanning direction. The thus deflected light beam passes again the soundproof glass 51 and is collected by the f-θ lens 25. The collected light beam L is reflected by the reflection mirror 45, and the reflected light beam irradiates the surface of the corresponding photoreceptor 10 after passing through a dust-proof glass plate 28.

Reference numeral 44 denotes a synchronous optical system. The synchronous optical system 44 receives a light beam passing through the f-θ lens 25 and reflected by a synchronization detection mirror 44a and outputs a synchronization signal. The synchronous optical system 44 is constituted of the synchronization detection mirror 44a, an imaging lens 44b, and an electric circuit board 44d having a photoelectric element 44c.

In this regard, a collection length (L0) of the light beam between the deflector 50 and the collection point of the light beam is determined depending on the structures and arrangement of the light source unit 41, the collimator lens 52, the cylindrical lens 53, and the f-θ lens 25. The collection lengths of the light beams for irradiating the photoreceptors 10Y, 10C, 10M and 10K are the same as each other.

Figure 6:
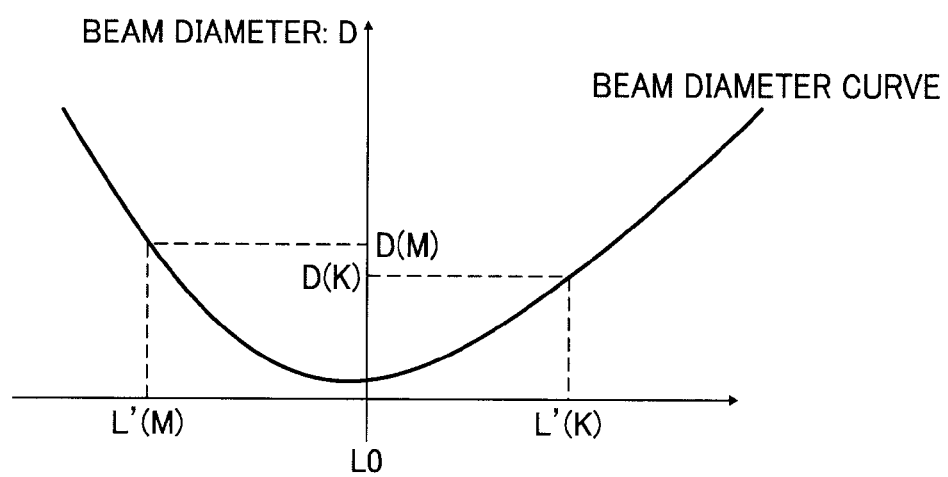
FIG. 6 is a graph showing relation between light path of a light beam and beam diameter of the light beam.

FIG. 6 is a graph illustrating the relation between the length of light path of a light beam and the diameter of the light beam. Referring to FIG. 6, the diameter D of a light beam is minimized when the length of the light path is equal to the collection length L0, and increases as the length of the light path is apart from the collection length L0. As illustrated in FIG. 6, the beam diameter curve is typically asymmetric relative to a vertical axis passing through the collection length L0. When the beam diameter falls within a certain range, the beam does not affect the image forming operation. The limit of the beam diameter can be determined from the properties of the electrostatic latent image formed by the light beam, and when the beam diameter falls in a range of from about 100 μm to about 120 μm, the beam does not affect the image forming operation of recent image forming apparatuses (i.e., high quality optical images can be formed). The beam diameter can be measured using a general purpose beam profile measuring instrument.

On the other hand, by using a current technique of molding an f-θ lens, it is possible that the beam diameter falls in a range of from about 50 μm to about 80 μm when the light path is the collection length L0, and falls in a range of from 100 μm to about 120 μm when the light path is within ±5 mm of the collection length L0. It is preferable that the diameters of the light beams used for forming magenta, cyan and yellow images are substantially the same because the resultant magenta, cyan and yellow toner images are satisfactorily overlaid.

Since the lengths of the light paths satisfy the relation, L'(K)>L'(Y)=L'(C)=L'(M), as mentioned above, the collection length L0 is preferably set so as to satisfy one of the following relations:

$$L'(K) \geq L0 > L'(Y) = L'(C) = L'(M), \text{ and}$$

$$L'(K) > L0 \geq L'(Y) = L'(C) = L'(M).$$

Namely, the collection length L0 is set so as to fall in a range of from the minimum of the lengths of the light paths (i.e., L'(Y), L'(C) and L'(M)) to the maximum of the lengths of the light paths (i.e., L'(K)).

By setting the collection length L0 to satisfy an equation L0=(L'(K)+L'(M))/2, the difference between the beam diameters of light beams used for forming black, yellow, cyan and magenta images can be minimized, thereby forming a good combined color toner image in which black, yellow, cyan and magenta toner dot images having substantially the same diameter are overlaid.

Figure 7:
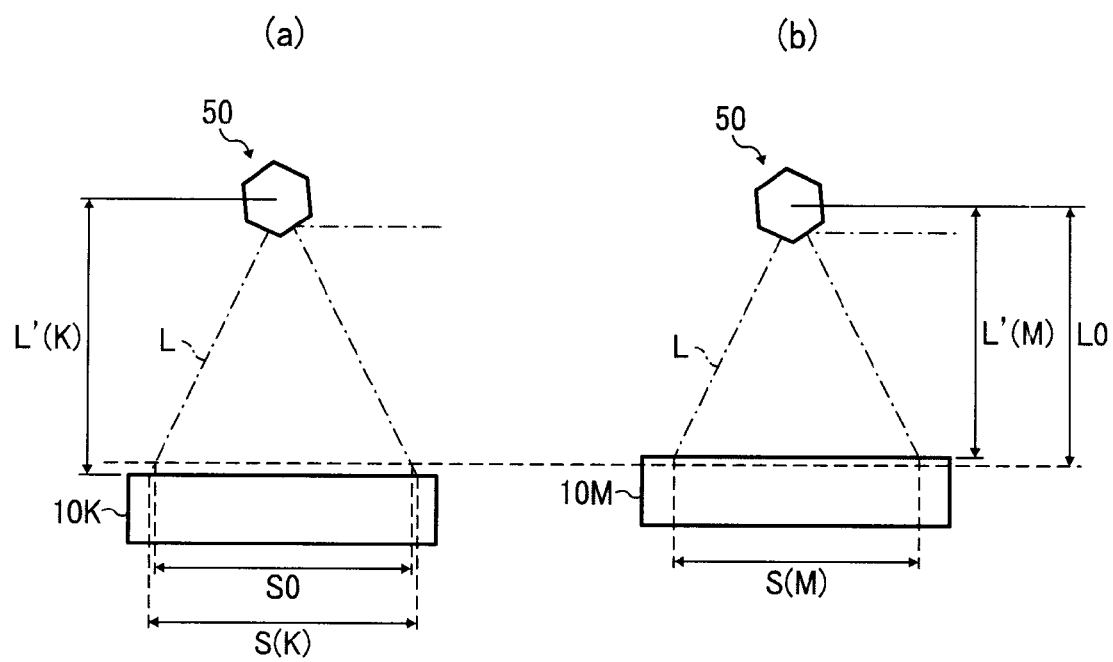
FIGS. 7(a) and (b) are schematic views for explaining change of magnification of an optical image formed on a photoreceptor when light path of a light beam is changed.

FIGS. 7(a) and 7(b) are schematic views illustrating magnification (size) of optical images to be formed on the photoreceptors 10K and 10M for forming black and magenta images, respectively.

The light beam L emitted by the light source unit 41 (illustrated in FIG. 5) and deflected and scanned by the deflector 50 reaches the surface of the photoreceptor 10 as illustrated in FIGS. 7(a) and 7(b). Since the lengths of the light paths L'(K) and L'(M) are different from each other and the collection length L0, the magnification (size) S(K) of the optical image formed on the black image forming photoreceptor 10K is different from the magnification (size) S(M) of the optical image formed on the magenta image forming photoreceptor 10M.

For example, when the light path L'(K) is longer than the collection length L0 as illustrated in FIG. 7(a), the width S(K) of the optical image formed on the black image forming photoreceptor 10K is larger than a standard width S0 of an optical image formed on the photoreceptor when the light path length is equal to the collection length L0. In addition, when the light path length L'(M) is shorter than the collection length L0 as illustrated in FIG. 7(b), the width S(M) of the optical image formed on the magenta image forming photoreceptor 10M is shorter than the standard width S0 of an optical image formed on the photoreceptor 10 when the light path length is equal to the collection length L0.

Therefore, the width S(X) (e.g., S(K) and S(M)) (i.e., magnification of a beam scanning line in the main scanning direction) of an optical image on the photoreceptor 10 is preferably corrected with a magnification correction coefficient e based on the properties of the optical scanning elements of the optical scanning device. For example, the magnification correction coefficient e(K) for a light beam used for forming black images can be determined by the following equation:

$$e(K)=1+\theta(L(K))/\theta(L0)$$

wherein θ(L) represents the deflecting angle of the light beam L at the deflection surface calculated from the fθ properties of the fθ lens.

By correcting the pixel clock with the correction coefficient e, the magnification of a beam scanning line in the main scanning direction of an optical image on the photoreceptor 10 can be corrected.

When the image forming apparatus (or optical scanning device) has an automatic scanning line tilt adjusting mechanism (serving as an irradiation position adjusting mechanism) selected from known automatic scanning line tilt adjusting mechanisms, it is preferable that the amount of tilt of a scanning line per unit resolution is corrected with the correction coefficient e.

Figure 8:
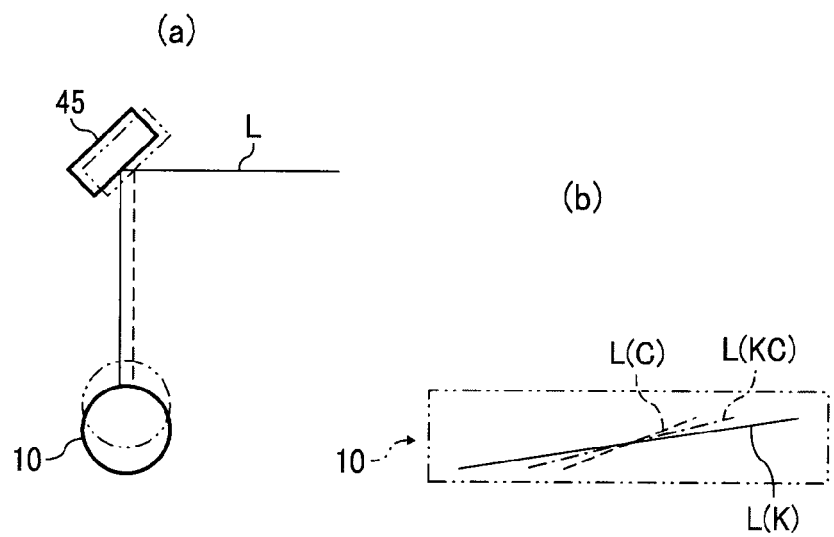
FIG. 8 is a schematic view for explaining correction of inclination of a scanning line.

When the scanning line is corrected using the reflection mirror 45 or the like, it seems that there is no change in the scanning line as illustrated in FIG. 8(a) even when the distance to the photoreceptor 10 is changed. However, as illustrated in FIG. 8(b), the magnification of the scanning line in the main scanning direction is changed, and therefore the tilts of the scanning lines of the light beams L(C) and L(K) used for forming cyan and black images are different from each other. Therefore, it is preferable to correct the tilts of the scanning lines with the correction coefficient e. The corrected scanning line is represented by L(CK) in FIG. 8(b). In this regard, the tilts of the scanning lines illustrated in FIG. 8(b) are emphasized for convenience of explanation.

In conventional image forming apparatuses using plural same optical scanning devices, each of the optical scanning devices has to be subjected to a specific adjustment based on the installation location thereof. In addition, in a case where the distances between optical scanning devices and photoreceptors are different (for example, in a case where photoreceptors are not linearly arranged), the adjustment factors for the optical scanning devices are largely different from each other based on the installation locations of the optical scanning devices, and therefore it is necessary to largely change the positions and/or properties of the optical elements to obtain desired light beams (i.e., to form a desired optical image on the photoreceptors).

Therefore, it is preferable for such an image forming apparatus that when the optical scanning devices are detached therefrom and then attached thereto, the optical scanning devices are returned to the original positions so as not to perform wasteful adjustment on the optical scanning devices.

The image forming apparatus of the present invention has plural same optical scanning devices, and when the optical scanning devices are detached therefrom, the optical scanning devices can be attached only to the original positions.

Hereinafter the feature of the present invention will be described in detail. In the following example of the image forming apparatus of the present invention, the optical scanning devices 4A and 4B are located above four photoreceptors. However, the location of the optical scanning devices is not limited thereto, and the optical scanning devices may be located below four photoreceptors as illustrated in FIG. 1.

Figure 9:
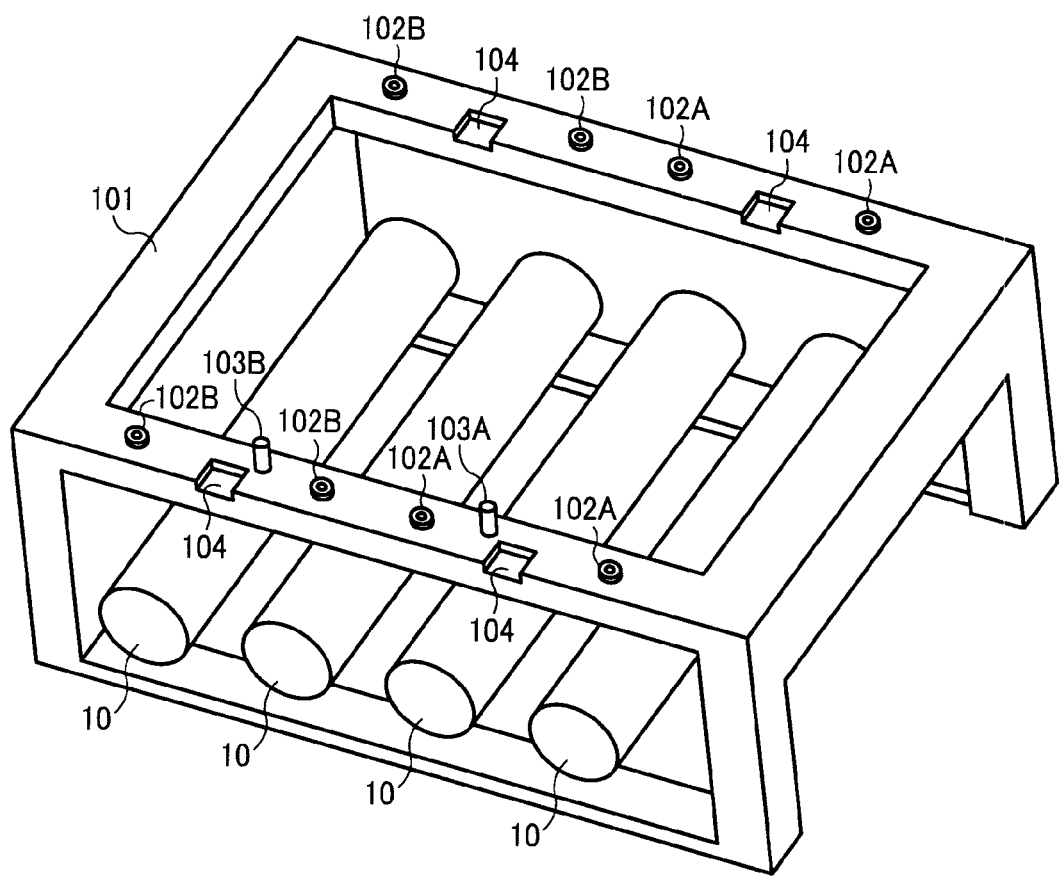
FIG. 9 is a schematic view illustrating photoreceptors and a chassis of the image forming apparatus.
Figure 10:
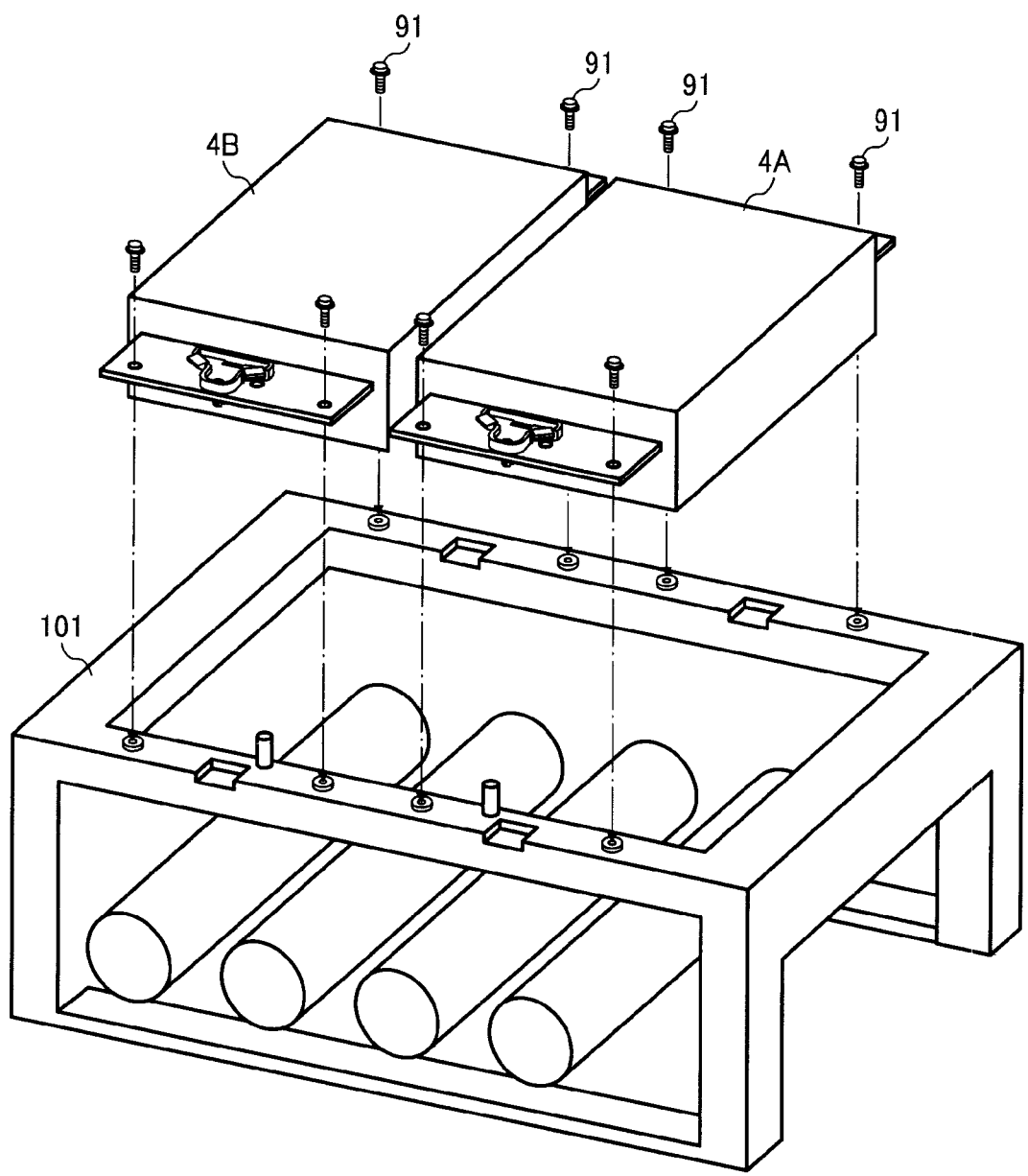
FIG. 10 is an exploded perspective view for explaining how optical scanning devices are set to the chassis of the image forming apparatus.

FIG. 9 illustrates the photoreceptors and chassis of an example of the image forming apparatus of the present invention, and FIG. 10 is a view for explaining how the two optical scanning devices are attached to the chassis.

As illustrated in FIGS. 9 and 10, a chassis 101 is provided so as to surround the four photoreceptors 10 of the four tandem image forming units. The chassis 101 has installation portions 102A and 102B on the upper surface thereof, on which the optical scanning devices are to be installed. In addition, positioning pins 103A and 103B serving as incompatibility imparting members are provided on the front upper surface of the chassis 101 while projecting from the surface. When the optical scanning devices 4A and 4B are attached to the chassis 101, the positioning pins 103A and 103B are inserted into positioning holes provided on fixed portions 150 (illustrated in FIG. 11) of the optical scanning devices so that each of the optical scanning devices is set to the predetermined position. Further, a notch 104 is provided in the vicinity of each of the positioning pins 103A and 103B.

Four installation portions 102A (or 102B) are provided for the optical scanning device 4A (or 4B). In this example, the installation portions 102 are screw holes into which screws 91 are to be inserted. However, the installation portions are not limited thereto, and for example a mechanism using an elastic force such as blade springs can also be used therefor. In addition, the number of the installation portions 102 for each optical scanning device is not limited to four, and the number may be 3, 5 or a greater number. The optical scanning devices 4A and 4B have the same structure before being set to the image forming apparatus. Namely, the optical scanning devices 4A and 4B are compatible with each other before being set to the image forming apparatus.

Figure 11:
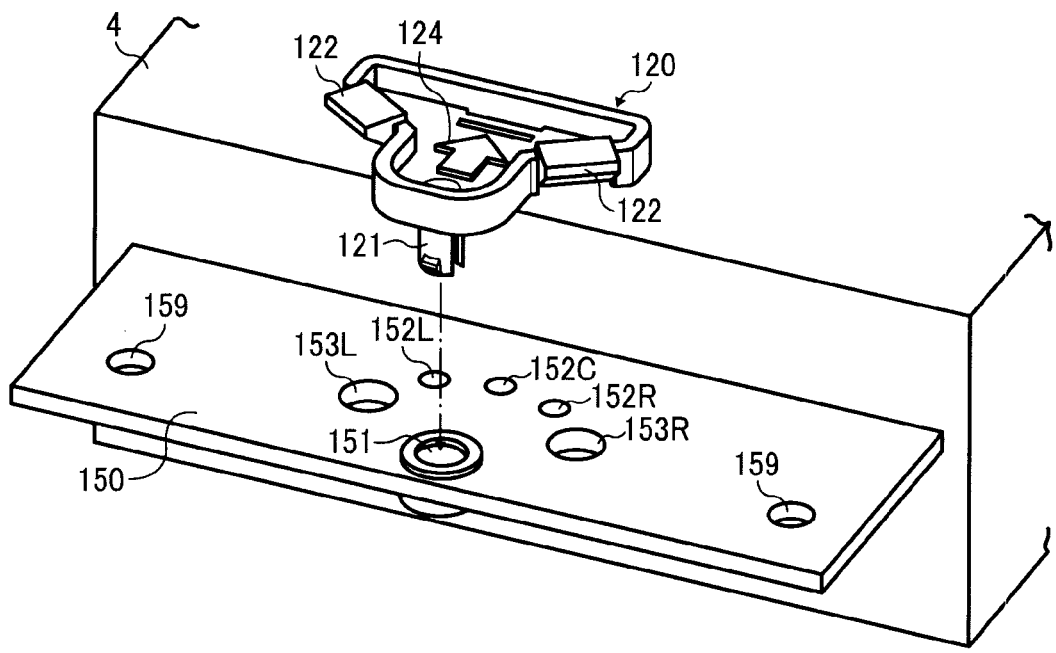
FIG. 11 is an exploded perspective view illustrating an incompatibility imparting mechanism provided on an optical scanning device.

FIG. 11 is an exploded perspective view illustrating an incompatibility imparting mechanism to be provided on the optical scanning devices 4A and 4B. In this regard, the incompatibility imparting mechanisms used for the optical scanning devices 4A and 4B have the same structure, and therefore description will be made while omitting the suffixes A and B from the reference number (4) of the optical scanning device.

As illustrated in FIG. 11, the fixed portion 150, which is a thick plate and which is used for attaching the optical scanning device 4 to the chassis 101, is provided on the front side of the optical scanning device 4. A hole 159 is formed on each of right and left sides of the fixed portion 150 so that the fixed portion can be fixed to the installation portions 102A or 102 B of the chassis 101 using the screws 91. In addition, a hole 151 into which a snap fit 121 of a movable member 120 of the incompatibility imparting mechanism is to be inserted, three holes 152L, 152C and 152R with which a projection 123 of the movable member 120 is to be engaged, and positioning holes 153L and 153R, into which the positioning pin 103 is to be inserted, are formed on the central portions of the fixed portion 150.

Figure 12:
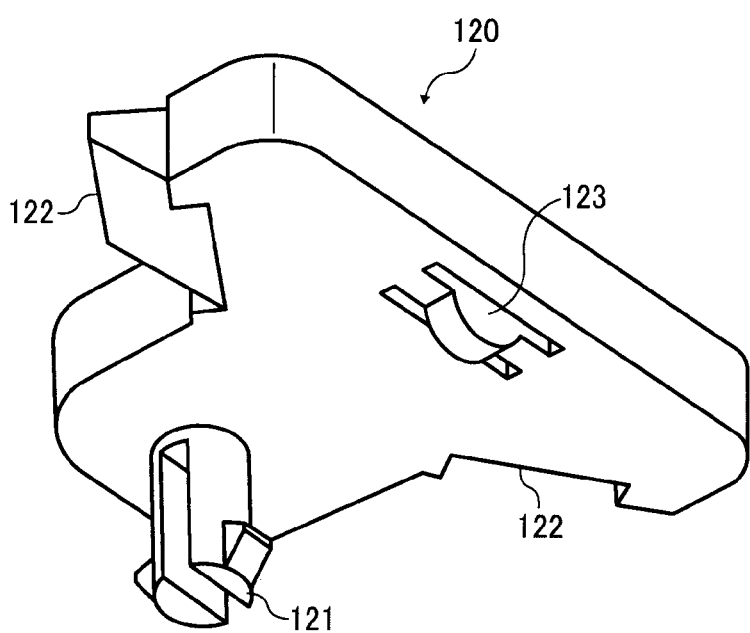
FIG. 12 is a perspective view illustrating the lower side of the incompatibility imparting mechanism illustrated in FIG. 11.

The movable member 120 of the incompatibility imparting mechanism is attached to the fixed portion 150. As illustrated in FIGS. 11 and 12, the movable member 120 has the snap fit 121, and the projected portion 123 formed on the backside of the movable member 120. In addition, slanting portions 122 and 122 are formed on shoulders of the T-form movable member 120.

The height of the projected portion 123 is determined such that when the snap fit 121 is inserted into the hole 151 of the fixed portion 150 to attach the movable member 120 to the fixed portion, the projected portion 123 is contacted with the upper surface of the fixed portion 150 while the fixed portion is slightly deformed elastically in the vertical direction. In this case, the movable member 120 can rotate on the snap fit 121 (or the hole 151), and when the tip of the projected portion 123 is engaged with any one of the hole 152L, 152C and 152R, the elastic deformation of the fixed portion 150 is canceled. Thus, the movable member 120 can stably positioned in the rotating direction (i.e., the angle of the moving member is fixed).

When the optical scanning device 4 is assembled, the movable member 120 is set so that the projected portion 123 is engaged with the central hole 152C. Therefore, the optical scanning device 4 can be set on the right or left side of the chassis of the image forming apparatus, i.e., can be set on any one of the positioning pins 103A and 103B (illustrated in FIG. 9).

Figure 13:
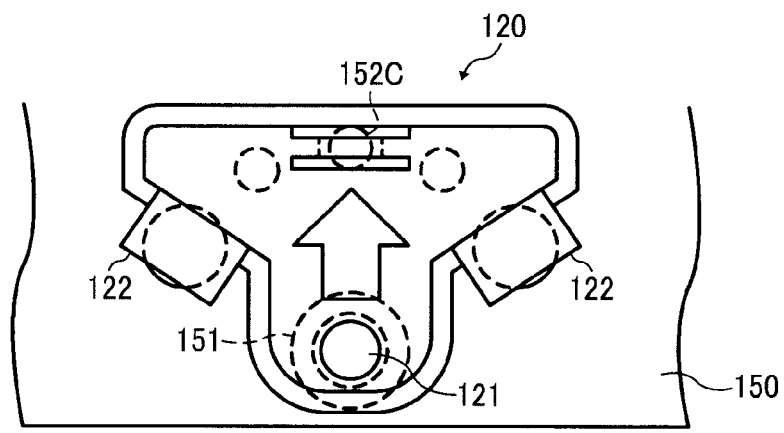
FIGS. 13(a)-13(c) are schematic views for explaining how the incompatibility imparting mechanism operates.
Figure 13:
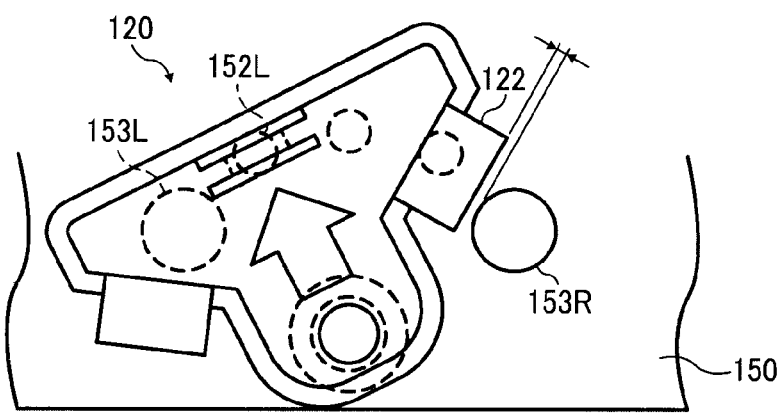
Figure 13:
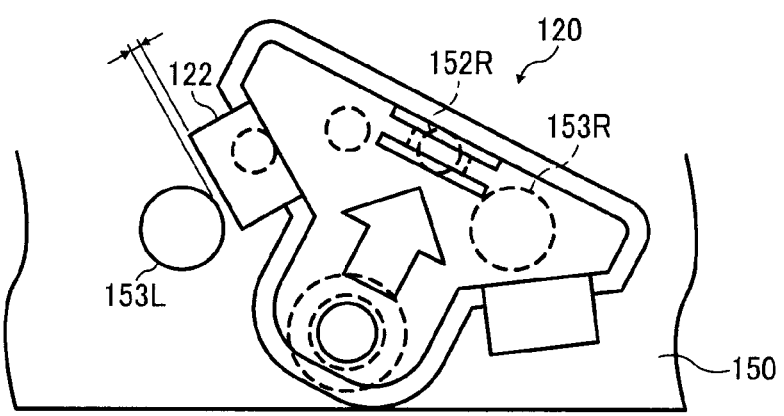

FIGS. 13(a)-13(c) are schematic views for explaining how the movable member 120 of the incompatibility imparting mechanism operates on the fixed portion 150. FIG. 13(a) illustrates the movable member 120 set on the fixed portion 150 so that the projected portion 123 thereof is engaged with the central hole 152C, FIG. 13(b) illustrates the movable member set on the fixed portion so that the projected portion is engaged with the left hole 152L, and FIG. 13(c) illustrates the movable member set on the fixed portion so that the projected portion is engaged with the right hole 152R.

Referring to FIGS. 13(b) and 13(c), even when the movable member 120 of the incompatibility imparting mechanism is rotated leftwards or rightwards so that the projected portion 123 is engaged with the hole 152L or 152R, there is a gap between the tip of the slanting portion 122 and the positioning hole 153L or 153R. Therefore, even when the positioning pin 103 of the image forming apparatus is inserted into the positioning hole 153, the positioning pin is not contacted with the movable member 120, and the optical scanning device 4 is contacted only with the chassis 101 and the installation portions 102 (except for contact of the positioning pin 103 with the edge of the positioning hole 153 of the fixed portion 150). Accordingly, the optical scanning device can maintain good positioning property. In this regard, it can be understood from FIGS. 13(b) and 13(c) that when the movable member 120 is rotated leftwards or rightwards, the opposite positioning hole 153L or 153R illustrated by a broken line is located below a flat surface of the movable member 120 and is not located below the slanting portion 122.

Figure 14:
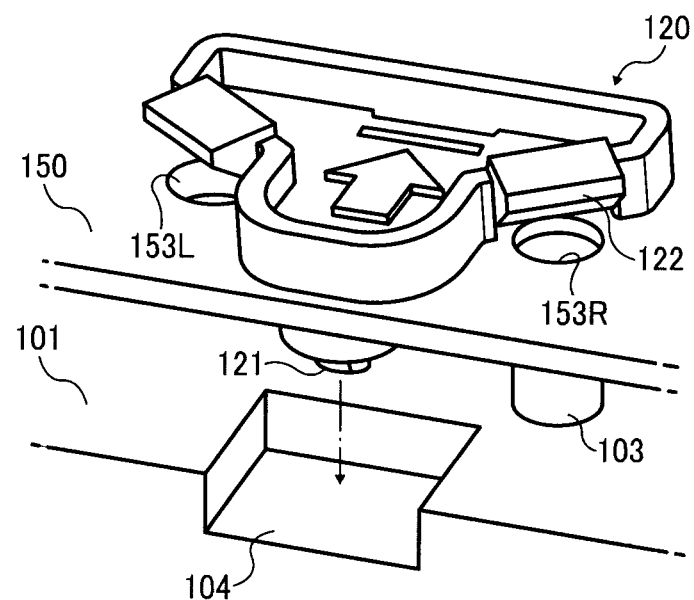
FIGS. 14(a) and 14(b) are schematic perspective views illustrating the incompatibility imparting mechanism having a positioning hole into which a positioning pin is inserted.
Figure 14:
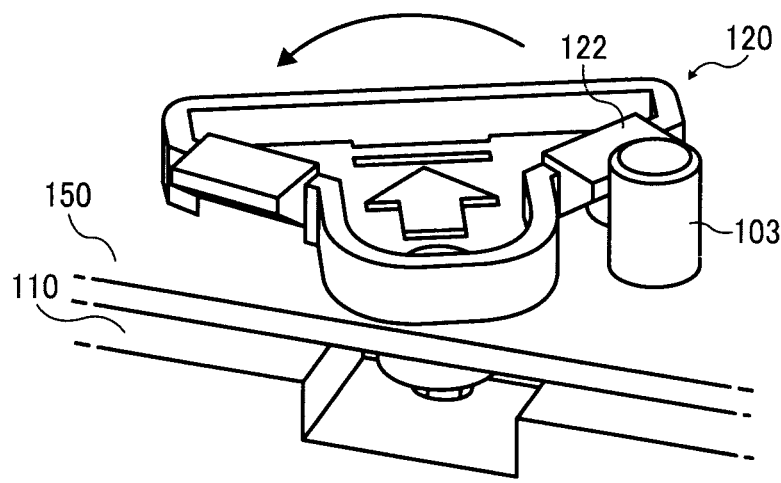
Figure 15:
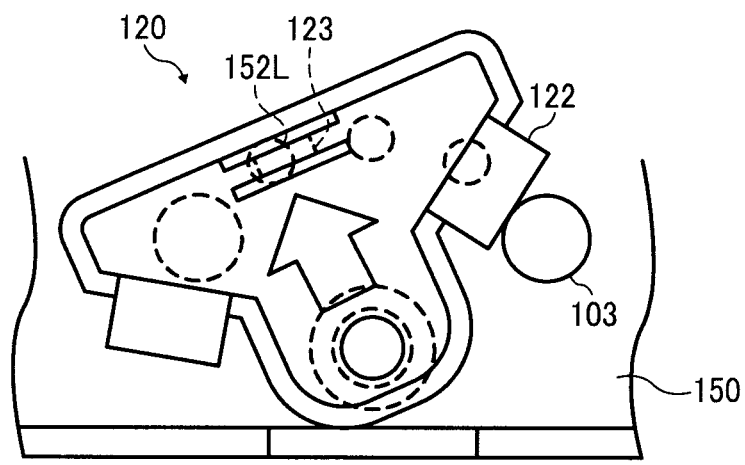
FIGS. 15(a) and 15(b) are schematic views for explaining how the incompatibility imparting mechanism operates when the optical scanning device is attached to the chassis.
Figure 15:
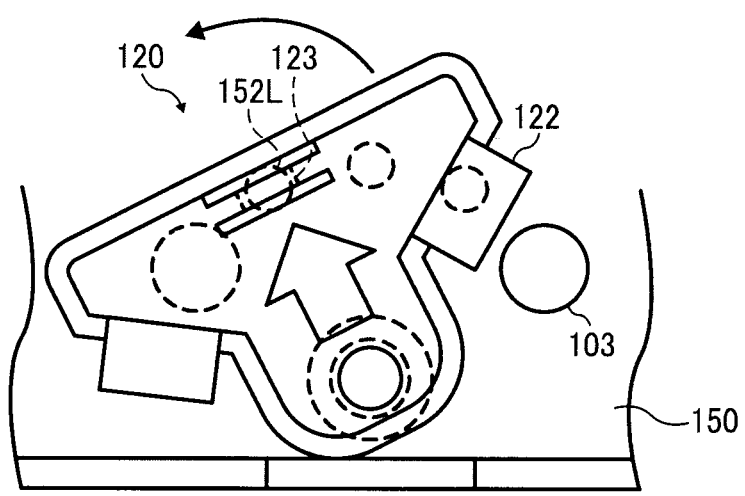
Figure 16:
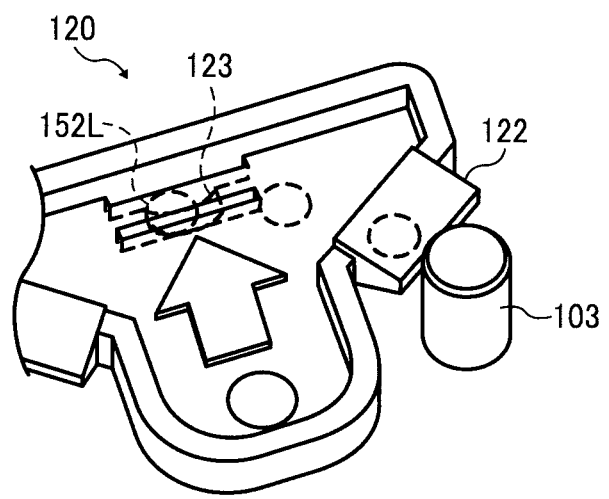
FIG. 16 is a perspective view illustrating the incompatibility imparting mechanism illustrated in FIG. 15.
Figure 16:
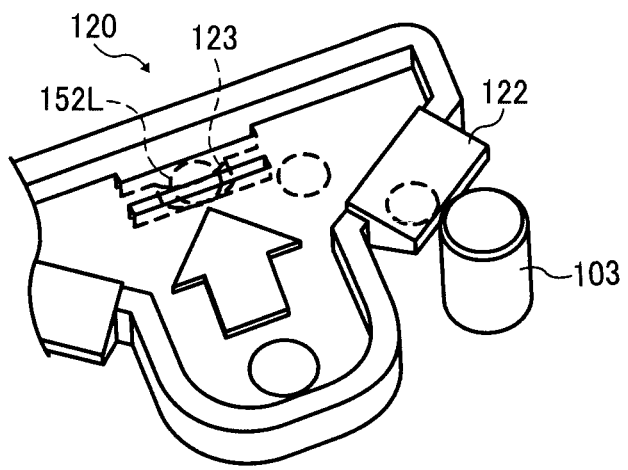

FIGS. 14(a) and 14(b) illustrate movable member 120 and the positioning pin 103 serving as a part of the incompatibility imparting mechanism and formed on the chassis 101 when the positioning pin is inserted, FIGS. 15(a) and 15(b) illustrate the behavior of the movable member 120 when the optical scanning device 4 is set on the chassis 101 and the positioning pin 103 is inserted into the positioning hole 153R, and FIGS. 16(a) and 16(b) are perspective views corresponding to the plan views of FIGS. 15(a) and 15(b). By reference to FIGS. 14-16, the behavior of the movable member 120 when the optical scanning device 4 (i.e., the left optical scanning device in this case) is set on the chassis 101 will be described.

When the optical scanning device 4 is set on the left side of the chassis 101 of the image forming apparatus from above, initially the positioning pin 103 is inserted into the positioning hole 153R of the fixed portion 150. When the optical scanning device 4 is further moved downward, the positioning pin 103 is contacted with the slanting portion 122 of the movable member 120, thereby rotating the movable member 120 in a direction indicated by an arrow illustrated in FIG. 14(b) (i.e., counterclockwise).

When the movable member 120 is rotated by the positioning pin 103, the projected half-circle portion 123 is partially engaged with the hole 152L. Namely, the tip of the projected portion 123 is located close to the center of the hole 152L but does not face the center of the hole. Next, the movable member 120 is further rotated such that the position of the movable member 120 is adjusted by the elastic force of the fixed portion 150 so that the projected portion 123 faces the center of the hole 152L. Thus, the movable member 120 (i.e., the optical scanning device 4) is stably positioned. In a case where the positioning pin 103 is inserted into the positioning hole 153L (i.e., the optical scanning device 4 is set on the right side of the chassis 101, the movable member 120 is rotated clockwise and takes such a position as illustrated in FIG. 13(c).

Figure 17:
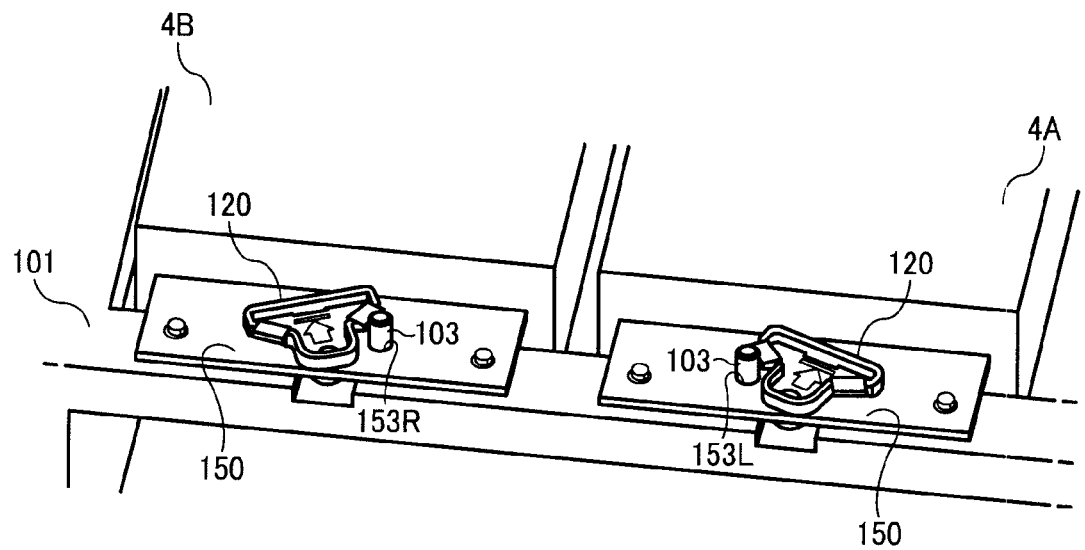
FIGS. 17(a) and 17(b) are perspective views illustrating operations of the incompatibility imparting mechanism on the optical scanning devices when the optical scanning devices are attached again to the image forming apparatus.
Figure 17:
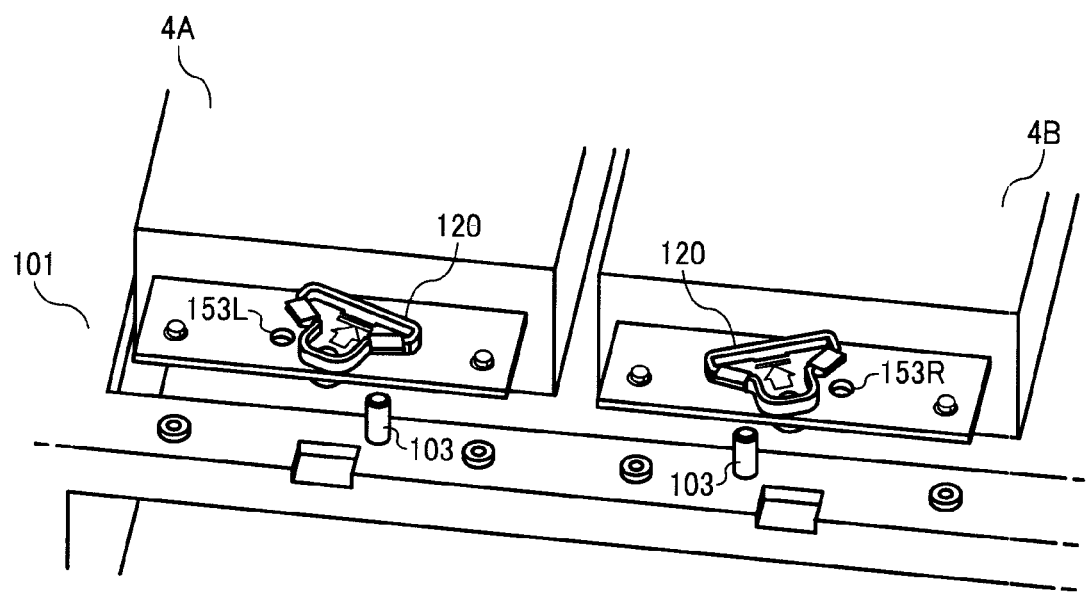

FIGS. 17(a) and 17(b) are perspective views illustrating the optical scanning devices 4A and 4B, which have been detached from the image forming apparatus and which are attached again to the image forming apparatus. Specifically, FIG. 17(a) illustrates that the optical scanning devices 4A and 4B are set again on the original positions in the image forming apparatus and FIG. 17(b) illustrates that the optical scanning devices 4A and 4B are set on the opposite (wrong) positions in the image forming apparatus.

Initially, the way to attach the optical scanning devices will be described by reference to FIG. 17(a).

As mentioned above, the optical scanning devices 4A and 4B have the same configuration, and the same device. Before being firstly set on the image forming apparatus, the optical scanning device 4 has an initial state (i.e., an assembled state) such that the projected portion 123 of the movable member 120 is engaged with the central hole 152c as illustrated in FIG. 13(a). When the optical scanning device 4 in the initial state is set on the left side of the chassis 101 of the image forming apparatus, the positioning pin 103 is inserted into the positioning hole 153R. In this case, the movable member 120 of the optical scanning device 4 is rotated counterclockwise, and the tip of the projected portion 123 is positioned so as to face the center of the hole 152L as illustrated in FIG. 15(b).

By contrast, when the optical scanning device 4 in the initial state is set on the right side of the chassis 101 of the image forming apparatus, the positioning pin 103 is inserted into the positioning hole 153L. In this case, the movable member 120 of the optical scanning device 4 is rotated clockwise, and the tip of the projected portion 123 is positioned so as to face the center of the hole 152R as illustrated in FIG. 13(c).

Thus, when the optical scanning devices 4 in the same initial state are set on the left and right sides of the chassis 101, the movable members 120 of the optical scanning devices are rotated in the different directions, and therefore the optical scanning devices achieve different states, i.e., incompatible states as illustrated in FIG. 17(a).

When the optical scanning devices 4, which have been detached from the image forming apparatus, are attached to the opposite sides of the chassis 101 as illustrated in FIG. 17(b), i.e., when the optical scanning device 4A and 4B are respectively attached to the left and right sides of the chassis, the positioning pins 103 cannot be inserted into the positioning holes 153R and 153L because the pins strike the backsides of the movable members 120. Therefore, the optical scanning devices 4 are prevented from being set to the wrong positions, i.e., the optical scanning devices 4 can be certainly set to the original positions as illustrated in FIG. 17(a).

As illustrated in FIG. 11, an arrow 124 serving as an indicator is formed on the upper surface of each of the movable members 120. As illustrated in FIG. 17(a), in the optical scanning device 4B set to the left side of the chassis 101 of the image forming apparatus, the arrow on the movable member 120 thereof faces leftwards due to rotation of the movable member. Therefore, when the optical scanning device 4B is detached from the image forming apparatus and is attached again thereto, it can be easily judged from the direction of the arrow 124 that the optical scanning device 4B should be set to the left side of the chassis 101 of the image forming apparatus. Similarly, in the optical scanning device 4A, which has been set to the right side of the chassis 101 of the image forming apparatus, the arrow on the movable member 120 thereof faces rightwards due to rotation of the movable member. Therefore, when the optical scanning device 4A detached from the image forming apparatus and is attached again thereto, it can be easily judged from the direction of the arrow 124 that the optical scanning device 4A should be set to the right side of the chassis 101 of the image forming apparatus.

If the arrow 124 faces forward (to the center), it can be easily judged from the direction of the arrow that the optical scanning device is in an initial state and is settable to both the sides.

Thus, a person in charge of installing the optical scanning devices 4 can easily determine the installation positions of the chassis 101, to which the optical scanning devices are to be set.

Since the direction of installation of the moving member 120 of the incompatibility imparting mechanism on the optical scanning device 4 is substantially the same as the direction of installation of the optical scanning device on the chassis 101, when it is tried to forcibly set the optical scanning device 4 to a wrong position by a powerful force, the snap fit 121 of the movable member 120 uncouples from the fixed portion 150 of the optical scanning device while the fixed portion is elastically deformed, and thereby the image forming apparatus and the optical scanning device are prevented from being damaged.

In the above-mentioned example, the incompatibility imparting mechanism is constituted of the movable member 120 (including the indicator 124 and the projected portion 123), the positioning pin 103, and the fixed portion 150 serving as an elastically deformable member (including the positioning holes 153 and the holes 152). However, the incompatibility imparting mechanism is not limited thereto.

Thus, the image forming apparatus of the present invention has the above-mentioned incompatibility imparting mechanism, and when the plural same optical scanning devices are detached from the image forming apparatus and then attached again thereto, the optical scanning devices can be easily set to the original positions, resulting in prevention of problems such that the maintenance costs increase due to interchange of the optical scanning devices, and dusts adhere to the optical scanning devices due to prolongation of the installation operation at a place other than the assembling floor.

Since the incompatibility imparting mechanisms used for the plural optical scanning devices are the same, it is possible to reduce the number of parts. In addition, it is not necessary to attach a faulty setting preventing mechanism to the incompatibility imparting mechanism. Namely, the same incompatibility imparting mechanism is attached to each of the optical scanning devices.

As mentioned above, when the optical scanning device is once set to a position of the image forming apparatus, the optical scanning device cannot be set to the other position. Therefore, when the optical scanning device is detached from the image forming apparatus and then attached again thereto, the optical scanning device can be certainly set to the original position without particular care.

Hereinbefore, the present invention has been described by reference to the drawings, but the present invention is not limited thereto. For example, the configuration of the plural optical scanning devices concerning scanning is not particularly limited, and any known configurations can be used therefor except that the same configuration is used for the plural optical scanning devices. In addition, the optical scanning devices can be set above or below the photoreceptors (tandem image forming units).

Further, the configuration of the image forming section of the image forming apparatus is not particularly limited. For example, the arrangement of the image forming units 7Y, 7C, 7M and 7K is not limited to the arrangement illustrated in FIG. 1. Furthermore, the present invention is not limited to image forming apparatuses having four image forming units, and can be applied to image forming apparatuses having two or three image forming units. Needless to say, the image forming apparatus of the present invention is not limited to printers, and may be copiers, facsimiles or multifunction image forming apparatuses.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2010-146090, filed on Jun. 28, 2010, the entire contents of which are herein incorporated by reference.

What is claimed is:

1. An image forming apparatus comprising:
  a chassis;
  plural image bearing members;
  plural optical scanning devices having a same configuration and located on respective installation positions of the chassis after installed thereon to scan the plural image bearing members with light beams; and
  plural incompatibility imparting mechanisms located on the corresponding optical scanning devices and having a same configuration and a same initial state before the plural optical scanning devices are installed on the chassis, wherein each of the plural incompatibility imparting mechanisms is set to one of a plural incompatibility states during installation of the corresponding optical scanning devices to the respective installation positions, a change from a compatible state to an incompatibility state is caused by movement of part of the incompatibility imparting mechanism, relative to the optical scanning device, during installation of the plural optical scanning devices on the chassis, and when the plural optical scanning devices are detached from the chassis and then attached again thereto, the incompatibility imparting mechanisms in the respective incompatibility states physically prevent the corresponding optical scanning devices from being installed to positions other than the respective installation positions of the chassis.

2. The image forming apparatus according to claim 1, wherein the plural incompatibility imparting mechanisms in the initial state are in the compatible state.

3. The image forming apparatus according to claim 1, wherein each of the incompatibility imparting mechanisms includes:
a movable member located on the corresponding optical scanning device; and
an incompatibility imparting member located on the chassis,
wherein when the plural optical scanning devices with the incompatibility imparting mechanisms in the initial state are installed on the chassis, the incompatibility imparting members move the corresponding movable members so that the incompatibility imparting mechanisms achieve the incompatible states.

4. The image forming apparatus according to claim 3, wherein after the plural optical scanning devices are installed on the chassis, the movable members are separated from the corresponding incompatibility imparting members.

5. The image forming apparatus according to claim 3, wherein the movable members are rotatable within a certain range and take a center position in the range when the incompatibility imparting mechanisms are in the initial state, and wherein when the plural optical scanning devices are installed on the chassis from above, the movable members are rotated leftwards or rightwards by the corresponding incompatibility imparting members to take incompatible positions, and maintain the incompatible positions after the plural optical scanning devices are installed on the chassis.

6. The image forming apparatus according to claim 5, wherein each of the incompatibility imparting mechanisms includes:
an incompatible state achieving member to adjust the corresponding movable member to achieve the incompatible state when the movable member is moved by the incompatibility imparting member so as to be close to the incompatible position thereof.

7. The image forming apparatus according to claim 3, wherein each of the movable members includes:
an indicator to indicate that the corresponding incompatibility imparting mechanism is in the compatible state or the incompatible state.

8. The image forming apparatus according to claim 7, wherein the indicator of the movable member indicates one of the installation positions of the chassis, to which the corresponding optical scanning device with the movable member is to be set.

9. The image forming apparatus according to claim 3, wherein each of the incompatibility imparting mechanisms includes:
an elastically deformable member located on the corresponding optical scanning device and on which the movable member is set, and
wherein when the optical scanning devices with the moving members in the incompatible states are set to positions different from the respective positions of the chassis after detached from the chassis, the elastically deformable members are elastically deformed to separate the corresponding movable members from the corresponding optical scanning devices.

10. The image forming apparatus according to claim 1, wherein a scanning position of at least one of the plural image bearing members, on which at least one of the optical scanning devices performs scanning with a light beam, is not on a line of scanning positions of the other image bearing members.

11. The image forming apparatus according to claim 10, wherein each of the plural optical scanning devices includes:
a deflector to deflect at least one light beam emitted by the optical scanning device to scan at least one of the image bearing members with the at least one light beam,
wherein the light beams deflected by the deflectors have a same collection length L0, which is defined as a length between the deflector to a focus of the light beam deflected by the deflector, and light paths of the light beams of from the deflectors to the image bearing members have at least two different light path lengths including a maximum light path length L(MAX) and a minimum light path length L(MIN), and wherein the following relation is satisfied:

$L(MAX) > L0 > L(MIN).$

12. The image forming apparatus according to claim 11, wherein the following relation is satisfied:

$L0 = (L(MAX) + L(MIN))/2.$

13. A method for assembling an image forming apparatus including a chassis; plural image bearing members; and plural optical scanning devices having a same configuration to scan the plural image bearing members with light beams; and plural same incompatibility imparting mechanisms located on the corresponding optical scanning devices, comprising:
installing the plural image bearing members on the chassis; and
installing the plural optical scanning devices with the incompatibility imparting mechanisms in a same initial state on different installation positions of the chassis, wherein the installing the plural optical scanning devices causes each of the respective plural incompatibility imparting mechanisms to change from a compatible state, in which each of the optical scanning devices is able to be installed in any one of a plurality of installation positions, to any one of incompatibility states, in which each of the optical scanning devices is able to be installed in only one of the plurality of installation positions corresponding to the incompatibility states, the change from the compatible state to the incompatibility state is caused by movement of part of the incompatibility imparting mechanism, relative to the optical scanning device, during installation of the plural optical scanning devices on the chassis, and when the optical scanning devices with the incompatibility imparting mechanisms in the respective incompatibility states are detached from the chassis and then attached thereto, the incompatibility imparting mechanisms physically prevent the corresponding optical scanning devices from being installed to positions other than the respective installation position of the chassis.

14. An image forming apparatus comprising:
a chassis;
plural image bearing members;
plural optical scanning devices having a same configuration and located on respective installation positions of the chassis after installed thereon to scan the plural image bearing members with light beams; and
plural incompatibility imparting mechanisms located on the corresponding optical scanning devices and having a same configuration and a same initial state before the plural optical scanning devices are installed on the chassis while achieving incompatible states after the optical scanning devices are installed on the chassis, wherein when the plural optical scanning devices are detached from the chassis and then attached again thereto, the incompatibility imparting mechanisms in the incompatible states prevent the corresponding optical scanning devices from being set to positions other than the respective installation positions of the chassis,
wherein each of the incompatibility imparting mechanisms includes
a movable member located on the corresponding optical scanning device, and
an incompatibility imparting member located on the chassis,
wherein when the plural optical scanning devices with the incompatibility imparting mechanisms in the initial state are installed on the chassis, the incompatibility imparting members move the corresponding movable members so that the incompatibility imparting mechanisms achieve the incompatible states.

* * * * *